US007328923B1

(12) United States Patent
Urdiales

(10) Patent No.: US 7,328,923 B1
(45) Date of Patent: Feb. 12, 2008

(54) TOOL FOR LIFTING ELONGATED OBJECTS—ROTATABLE GRAPPLE

(76) Inventor: Gilberto Urdiales, 215 Illinois, Laredo, TX (US) 78041

( * ) Notice: Subject to any disclaimer, the term of this patent is extended or adjusted under 35 U.S.C. 154(b) by 0 days.

(21) Appl. No.: 11/268,443

(22) Filed: Nov. 7, 2005

Related U.S. Application Data

(60) Provisional application No. 60/626,192, filed on Nov. 9, 2004.

(51) Int. Cl.
*B65G 7/12* (2006.01)
(52) U.S. Cl. .......................................... 294/15; 294/165
(58) Field of Classification Search ................. 294/15, 294/16, 104, 165, 169, 137
See application file for complete search history.

(56) References Cited

U.S. PATENT DOCUMENTS

| 735,799 | A | * | 8/1903 | McGill | 294/16 |
|---|---|---|---|---|---|
| 1,651,607 | A | | 12/1927 | Kurtz | |
| 2,723,152 | A | | 11/1955 | Doty | |
| 2,752,190 | A | | 6/1956 | Baker | |
| 2,873,995 | A | * | 2/1959 | Turner | 294/15 |
| 2,915,333 | A | * | 12/1959 | Koenig et al. | 294/104 |
| 3,347,586 | A | * | 10/1967 | Sharp | 294/19.1 |
| 4,225,104 | A | * | 9/1980 | Larson | 248/125.8 |
| 4,601,505 | A | | 7/1986 | Chilton | |
| 4,632,442 | A | | 12/1986 | Gerding | |
| 4,717,187 | A | | 1/1988 | Delgado, Jr. | |
| 5,024,476 | A | | 6/1991 | Massey | |
| 5,791,704 | A | | 8/1998 | Thompson et al. | |
| 5,979,840 | A | | 11/1999 | Hollister et al. | |
| 2001/0030434 | A1 | | 10/2001 | Urdiales, Jr. | |
| 2001/0050487 | A1 | | 12/2001 | Urdiales, Jr. | |

OTHER PUBLICATIONS

Jan. 1, 2001, "Iron Grip Safety Systems, Inc.—Get A Grip On Safety" sales literature by Iron Grip Safety Systems, Inc.
Nov. 29, 2004, "Crescent Pipe Tongs"—Pollard Water's website description and price list.

* cited by examiner

*Primary Examiner*—Dean J Kramer
(74) *Attorney, Agent, or Firm*—George S. Gray

(57) ABSTRACT

A tool is provided for minimizing operator bending while lifting an elongated circular object, such as lengths of pipe. With one hand, the operator manipulates a slidable pin while grasping the tool handle. The slidable pin allows a rotatable grapple to move outward from the tool for positioning about the object, and, alternatively, to return the grapple toward the tool and secure the grapple in a position across from a positioning member, the grapple and positioning member being shaped to closely receive the object and hold the object between the grapple and the positioning member. A biasing element forces the slidable pin toward the rotatable grapple, the grapple being configured to receive the pin and be held in a position opposite the positioning member.

22 Claims, 13 Drawing Sheets

TOOL FOR LIFTING ELONGATED OBJECTS—ROTATABLE GRAPPLE

CROSS-REFERENCE TO PRIOR APPLICATIONS

The applicant claims the benefit of a provisional application filed by the above-named inventor on Nov. 9, 2004 (Ser. No. 60/626,192).

BACKGROUND OF THE INVENTION

1. Field of the Invention

The field of the invention relates generally to a device for lifting and carrying elongated objects such as pipes and hoses.

2. Description of Related Art

In oil field operations, it is frequently necessary to manually lift and carry oil field pipe or frac pipe. Similarly, in firefighting operations, fire hoses must be lifted and carried by hand. Typically, such pipes and hoses must be handled under wet and slippery conditions, which are generally hazardous to the personnel involved. Additionally, such pipes and hoses are generally quite heavy and difficult to handle, even under dry conditions, which causes physical fatigue in the personnel involved.

Published U.S. Patent. Application No. US-2001-0050487, filed by Gilberto Urdiales, Jr. on Apr. 16, 2001, discloses a handle and grapple with sliding closure. The tools described therein all utilize a single grapple and a pin having a first end that protrudes to a position opposite the grapple, such that the pin itself bears upon the elongated object and forms part of the securing enclosure.

Published U.S. Patent. Application No. US-2001-0030434-A1, filed by Gilberto Urdiales, Jr. on Apr. 16, 2001, discloses a tool for lifting and carrying elongated objects which is a single member tool that is curved to first scoop, then wrap and cradle, the elongated object.

U.S. Pat. No. 5,024,476, issued to Massey on Jun. 18, 1991, discloses a tool for assisting in manually raising a heavy elongated article a small distance (e.g., a few inches) off a firm surface so that a lifting sling may be passed beneath the article. The Massey tool comprises a handle having a pair of co-acting, part-cylindrical jaw members that operate in a scissor-like manner for gripping the article to be raised, and a fulcrum projects from one of the jaw members on which the tool can be pivoted to raise the article a short distance off the surface. Although the Massey tool is capable of raising heavy elongated objects such as oil field pipe a few inches off the deck, the Massey tool is not suitable for carrying such pipe after it has been lifted off the deck.

U.S. Pat. No. 5,791,704, issued to Thompson et al. on Aug. 11, 1998, discloses a tool for manipulating irrigation pipes. The Thompson et al. tool involves a pivotally mounted arcuate jaw with a handle secured thereto, and a second arcuate jaw fixedly mounted to the handle. A spring biases the jaw members into clamping engagement with an irrigation pipe. The Thompson et al. tool is directed primarily to turning, connecting, and disconnecting irrigation pipe without the operator having to bend over and grasp the pipe by hand. However, like the Massey tool described above, the Thompson et al. tool is not suitable for carrying such pipe.

U.S. Pat. No. 4,632,442, issued to Gerding on Dec. 30, 1986, discloses a conduit carrying device having two handles on either side of a closure member that closes about the elongated object.

U.S. Pat. No. 5,979,840, issued to Hollister, et al. on Nov. 9, 1999, discloses an apparatus for gripping a fluid carrying hose having a jaw that is placed about a pressurized hose and a plunger that can be manipulated to force a pair of flanges against the hose, thus cooperating with the jaw to secure the hose. A spring on the plunger biases the plunger in a manner that retracts the pair of flanges from the hose.

U.S. Pat. No. 2,723,152, issued to Doty on Nov. 8, 1955, discloses a fishing gaff with a hook and a spring-loaded keeper rod with a point that closes the hook. The spring biases the point to a position closing the hook U.S. Pat. No. 4,601,505, issued to Chilton on Jul. 22, 1986, discloses an industrial safety pull hook, having a hook and spring-loaded slidable member with an end that closes the hook. The spring biases the slidable member end to a position closing the hook.

U.S. Pat. No. 1,651,607, issued to Kurtz on Dec. 6, 1927, discloses a material handling device having a body portion with a recess for the shaft of a hook, and a spring-loaded locking member that closes the recess about the hook shaft. The spring biases the locking member to a position closing the recess.

U.S. Pat. No. 2,752,190, issued to Baker on Jun. 26, 1956, discloses a hand rod hook having a hook for receiving a pipe and a spring-loaded latch bar that closes the hook about the pipe. The spring biases the latch bar to a position closing the hook.

U.S. Pat. No. 4,717,187, issued to Delgado on Jan. 5, 1988, discloses an apparatus for imparting rotational movement to a work object, having a capture assembly having a cradle for receiving a portion of the object. The capture assembly rotates with respect to a force transmitting member having a handle. Such rotation forces a pressure plate against another portion of the object, thus grasping the entire object for rotation of the object in one direction.

While the foregoing devices are functional for the purposes stated for each, it remains that such devices do not provide the optimum tool for a user desiring to quickly and efficiently lift and carry elongated objects. For example, such tools do not provide effective means for attaching the tool to the object, automatically locking the tool in a closed position about the object, lifting the object, and releasing the tool from the object, using only a single hand. Thus, a need exists for a tool that would allow the user to easily grasp, lift, and carry pipes, hoses, and other elongated objects, particularly under wet and slippery conditions, using a single hand, with the tool locking about the object automatically. Such a handheld tool would increase safety and decrease physical fatigue of pipe handling personnel, and also decrease injuries to fingers that occur when bare hands are utilized. Such a tool should be simple to use, inexpensive to manufacture, and easy to maintain.

SUMMARY OF THE INVENTION

The present invention overcomes the shortcomings of the prior art by providing a tool optimized a user desiring to quickly and efficiently lift and carry elongated objects. My invention provides effective means for attaching the tool to the object, automatically locking the tool in a closed position about the object, lifting the object, and releasing the tool from the object, using only a single hand. My invention provides a tool that allows the user to easily grasp, lift, and carry pipes, hoses, and other elongated objects, particularly under wet and slippery conditions, using a single hand, with the tool locking about the object automatically. My invention increases safety and decreases physical fatigue of pipe handling personnel, by avoiding the back and shoulder injuries typically associated with having to pick up pipe by hand and with carrying pipe on the shoulder. My tool is simple to use, inexpensive to manufacture, and easy to maintain.

In one exemplary embodiment of my invention, I have provided a tool for grasping and lifting an elongated object, the tool comprising: a graspable lift member having a body and a positioning member extending from the body; a slidable pin member positioned on the lift member, the pin member having a first end and a graspable second end, the pin member being movable from a first position to a second position; and a rotatable grapple having an interior space capable of receiving the elongated object, the grapple being attached to the lift member for movement with respect to the lift member from a grapple first position to a grapple second position, the grapple having a pin member reception opening for receiving the pin member first end when the pin member and the grapple are each in the first position, such that the pin member retains the grapple in the first position; and further such that the grapple is free to rotate to the second position when the pin member is moved to the pin member second position, the grapple being open to accept the elongated object while in the grapple second position, the elongated object being secured within the grapple and the lift member positioning member when the grapple is moved to the first position.

In some exemplary embodiments of my invention, the tool further comprises a biasing element, the biasing element biasing the pin member toward the pin member first position, and in some exemplary embodiments, the biasing element is a spring.

In some exemplary embodiments of my invention, the grapple forces the pin member toward the pin member second position as the grapple moves toward the grapple first position, and in some such exemplary embodiments, the tool further comprises a biasing element, the biasing element biasing the pin member toward the pin member first position, the biasing element bias causing the pin member first end to enter the grapple pin member reception opening when the grapple returns to the grapple first position, the biasing element biasing the pin first member to remain in the grapple pin member reception opening.

In some exemplary embodiments of my invention, the lift member and the pin member second end are simultaneously graspable by a single human hand.

In some exemplary embodiments of my invention, the pin second end is movable toward the pin member second position while the lift member and the pin member are being simultaneously grasped by a single hand.

In some exemplary embodiments of my invention, the elongated object to be lifted is substantially tubular and has an outer diameter, and, further, the grapple has a curved interior, the curved interior having a diameter shaped to substantially correspond with the elongated object outer diameter.

In some exemplary embodiments of my invention, the elongated object to be lifted is substantially tubular and has an outer diameter, and, further, the lift member positioning member has a curved interior, the curved interior having a diameter to substantially correspond with the elongated object outer diameter.

In some exemplary embodiments of my invention, the elongated object to be lifted is substantially tubular and has an outer diameter, and, further, the grapple has a curved interior, the curved interior having a diameter at least as large as the elongated object outer diameter.

In some exemplary embodiments of my invention, the elongated object to be lifted is substantially tubular and has an outer diameter, and, further, the lift member positioning member has a curved interior, the curved interior having a diameter at least as large as the elongated object outer diameter.

In some exemplary embodiments of my invention, the pin member first end is substantially rectangular in cross-section and the grapple pin member reception opening is substantially rectangular for closely receiving the pin member first end.

In some exemplary embodiments of my invention, the grapple is rotatable in two directions with respect to the lift member body.

In some exemplary embodiments of my invention, the lift member has a handle by which the lift member is grasped, the pin member second end being positioned proximate the handle.

In some exemplary embodiments of my invention, the lift member body has a front side, the pin member is positioned on the lift member front side, and the grapple rotates clockwise with respect to the lift body member when viewed toward the front of the lift body member.

In some exemplary embodiments of my invention, the lift member body has a front side, the pin member is positioned on the lift member front side, and the grapple rotates counter-clockwise with respect to the lift body member when viewed toward the front of the lift body member.

In some exemplary embodiments of my invention, the lift member body has a front side, the pin member is positioned on the lift member front side, and the grapple is rotatable in a clockwise and a counter-clockwise direction with respect to the lift body member when viewed toward the front of the lift body member.

In one exemplary embodiment of my invention, I have provided a tool for grasping and lifting an elongated object, the tool comprising: a graspable lift member having a body and a positioning member extending from the body; a slidable pin member positioned on the lift member, the pin member having a first end and a second end, the pin member further comprising means for moving the pin member from a first position to a second position; and a rotatable grapple having an interior space capable of receiving the elongated object, the grapple being attached to the lift member for movement with respect to the lift member from a grapple first position to a grapple second position, the grapple further comprising means for receiving the pin member first end when the pin member and the grapple are each in the first position, such that the pin member retains the grapple in the first position; and further such that the grapple is free to rotate to the second position when the pin member is moved to the pin member second position, the grapple being open to accept the elongated object while in the grapple second position, the elongated object being secured within the grapple and the lift member positioning member when the grapple is moved to the first position.

In some exemplary embodiments of my invention, the tool further comprises means for biasing the pin member toward the pin member first position.

In some exemplary embodiments of my invention, the grapple further comprises means for forcing the pin member toward the pin member second position as the grapple moves toward the grapple first position In some exemplary embodiments of my invention, the tool further comprises means for biasing the pin member toward the pin member first position, such means causing the pin member first end to be received by the means for receiving the pin member fist end when the grapple returns to the grapple first position, such means biasing the pin first member to remain in a received position with respect to the means for receiving the pin member first end.

In some exemplary embodiments of my invention, the lift member further comprises means for holding the lift member, the pin member second end being positioned proximate the handle.

The foregoing features and advantages of my invention will be apparent from the following more particular descriptions of exemplary embodiments of the invention as illustrated, in some embodiments, in the accompanying drawings.

DETAILED DESCRIPTION OF EXEMPLARY EMBODIMENTS

Figure 1:
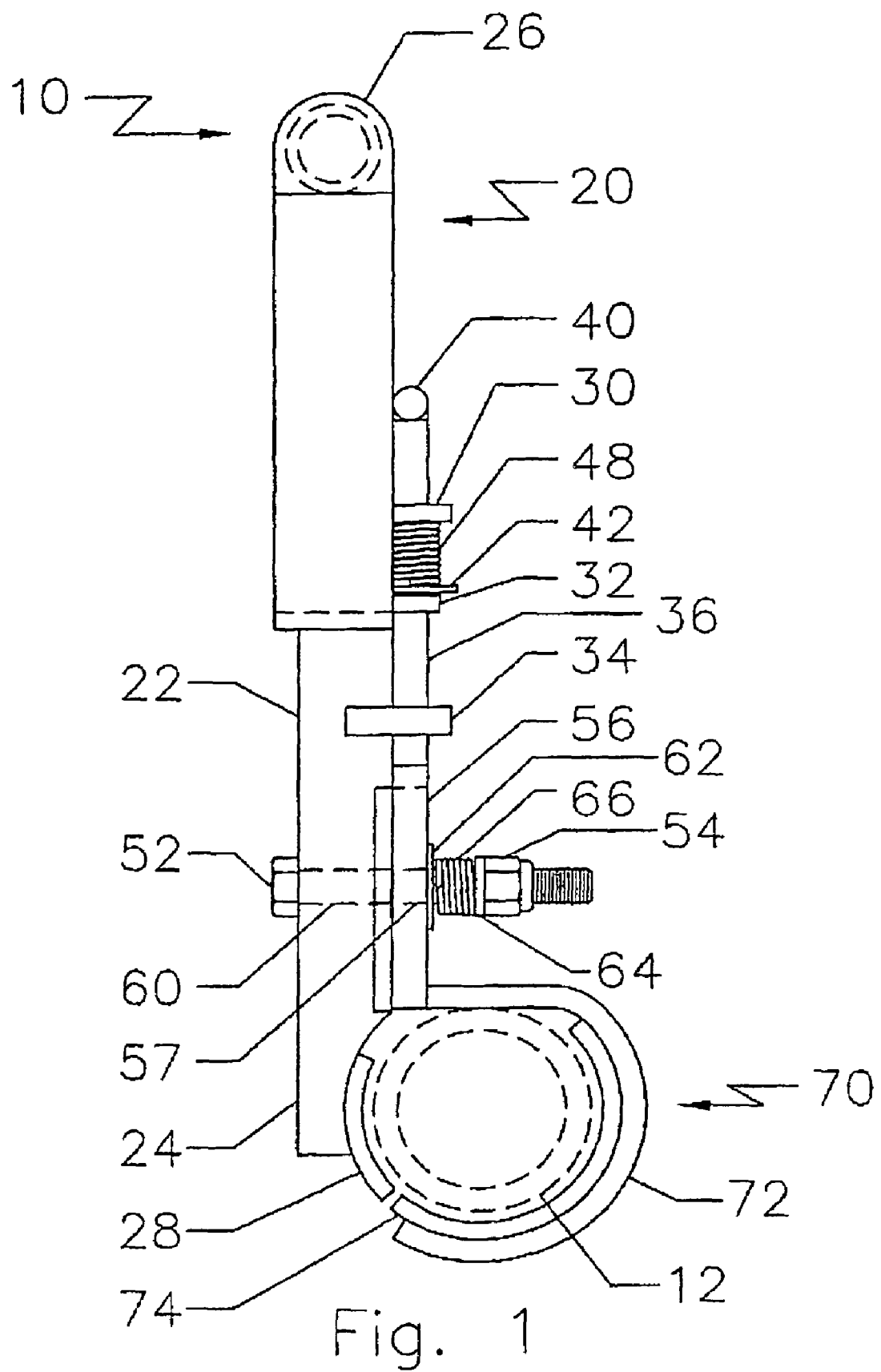
FIG. 1 is a side view of an exemplary embodiment of the present invention, with an elongated object, a pipe, shown, and the rotatable grapple in the first position (closed).
Figure 2:
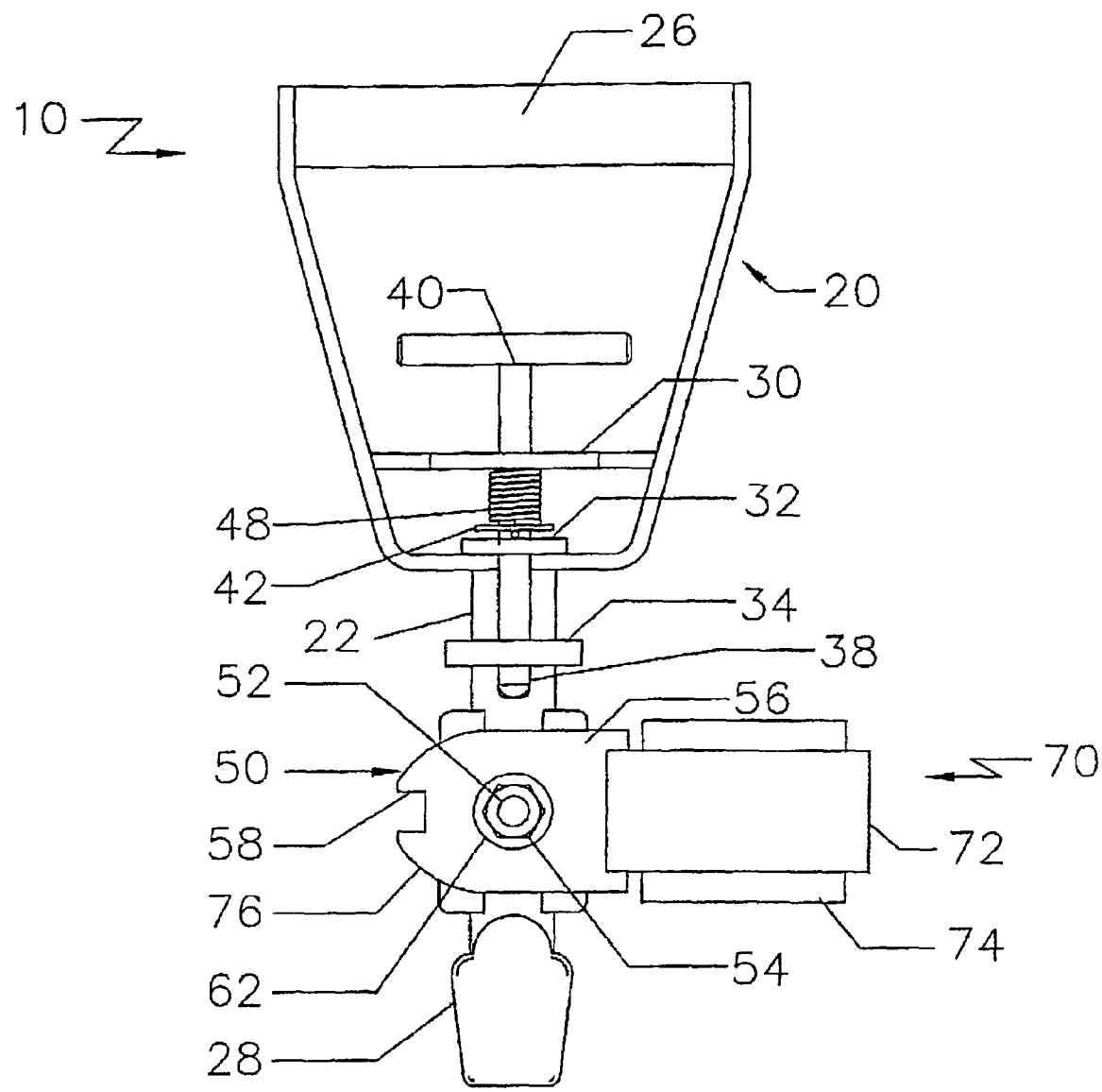
FIG. 2 is a front view of an exemplary embodiment of the present invention with the rotatable grapple in the second position (open).

The following discussion describes exemplary embodiments of the invention in detail. This discussion should not be construed, however, as limiting the invention to those particular embodiments. Practitioners skilled in the art will recognize numerous other embodiments as well.

Referring now to FIGS. 1-4, and FIGS. 14-15, wherein an exemplary embodiment of the present device 10 is depicted, and is shown to include a lift member 20, having a body 22 and a positioning member 24. In this exemplary embodiment, the lift member forms a tubular handle 26, and the positioning member has a curved portion 28 with a curved interior.

In this exemplary embodiment, and as shown in further detail in FIGS. 5-11, a first guide 30, second guide 32 and third guide 34 are positioned on the lift member, each having holes, such as the hole 31 shown in the first guide 30, the holes being aligned for positioning a pin member 36 on the body. The pin has a first end 38, a graspable second end 40, a washer 42, and a hole 44 for receiving a retaining pin 46, as shown particularly in FIGS. 9-11. In some exemplary embodiments, the pin is rectangular in cross-section.

As shown for this exemplary embodiment in FIGS. 1-4, the pin washer 42 is positioned on the installed pin 36, between the first and second guides 30,32, with a spring 48 being positioned between the washer and the first guide. In this position the spring biases the pin 36 to a first position, that is, toward the positioning member 24. The retaining pin 46 positions the washer 42 in the optimum position on the pin. In this exemplary embodiment, the handle 26 and the pin second end 40 are simultaneously graspable by a single hand, such that the pin is moved to a second position, in a direction away from the positioning member 24 as the hand clenches the handle 26 and the pin second end 40.

Figure 12:
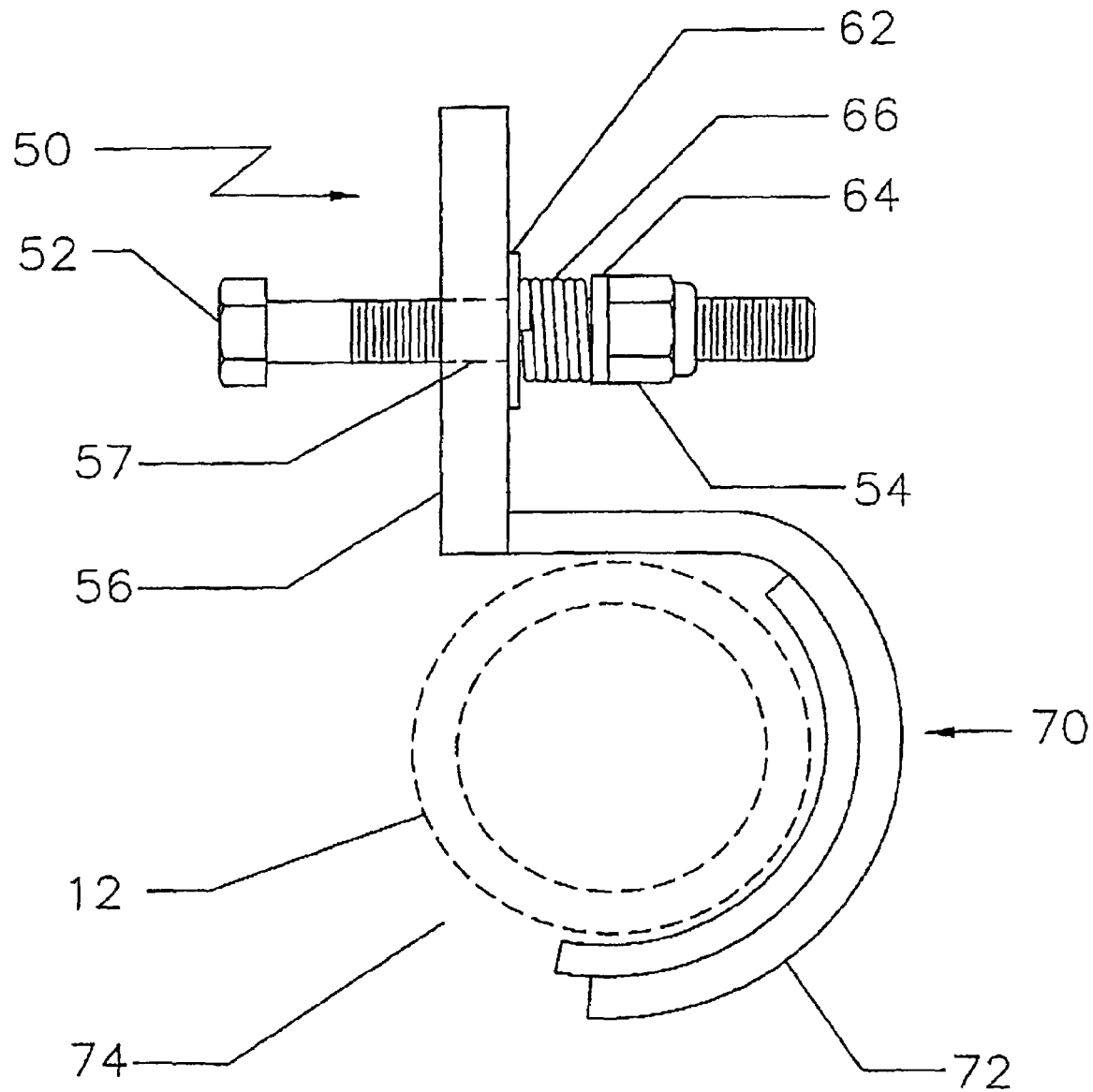
FIG. 12 is a side view of the rotatable grapple present in an exemplary embodiment of the present invention, also showing the nut, bolt, washers and spring utilized in attaching the rotatable grapple to the lift member.
Figure 13:
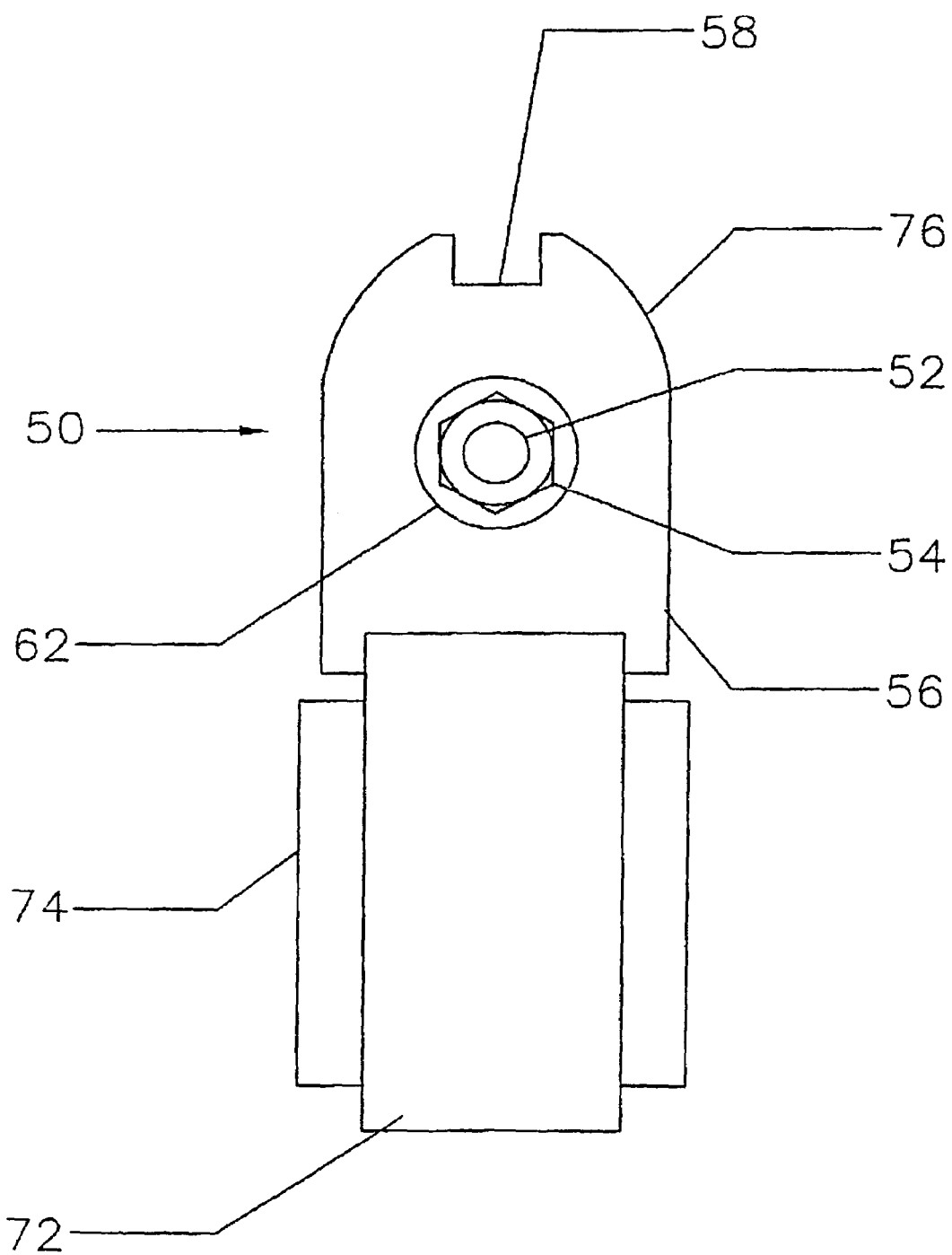
FIG. 13 is a front view of the rotatable grapple present in an exemplary embodiment of the present invention.
Figure 14:
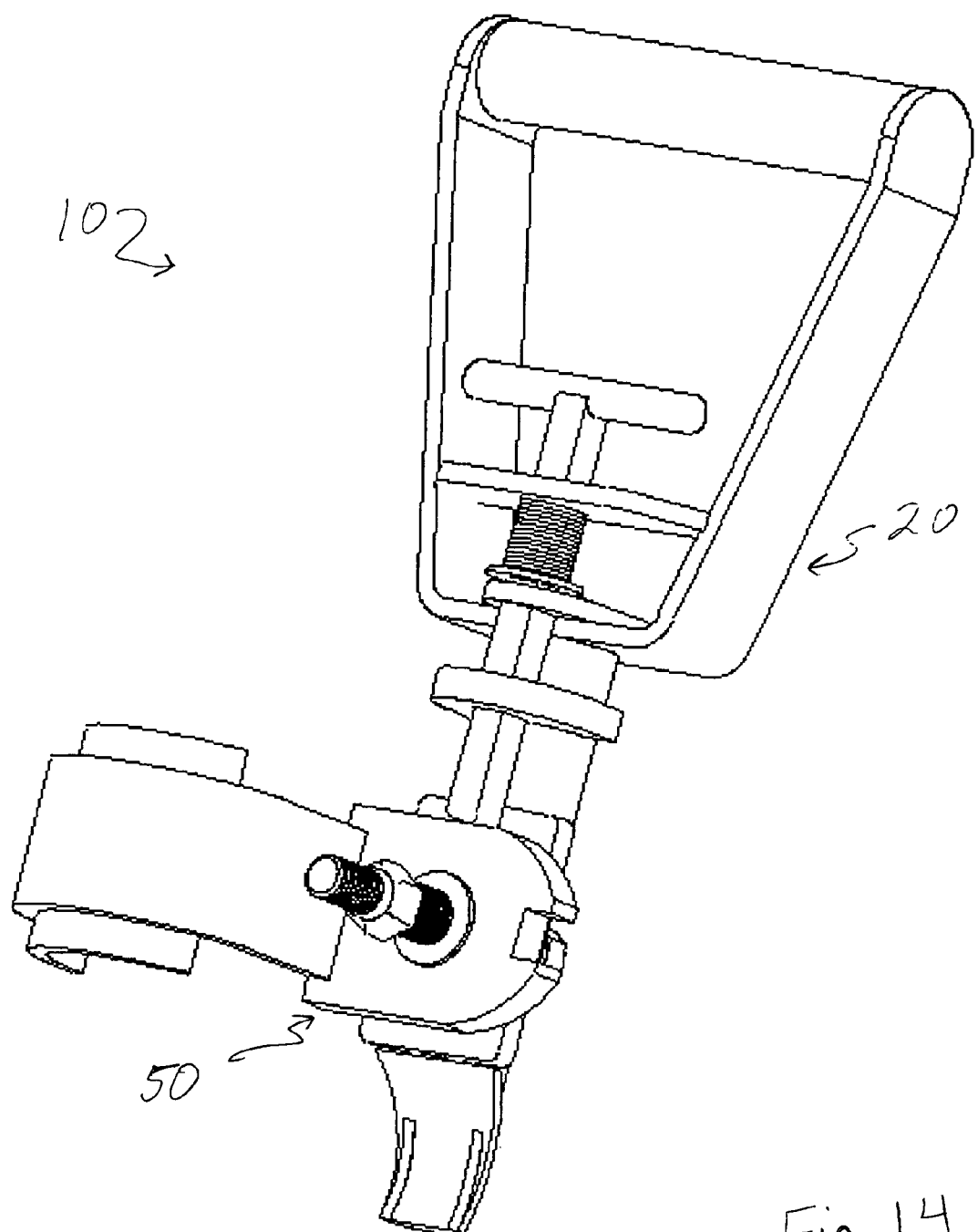
FIG. 14 is a perspective view of an exemplary embodiment of the present invention with the grapple rotated open.
Figure 15:
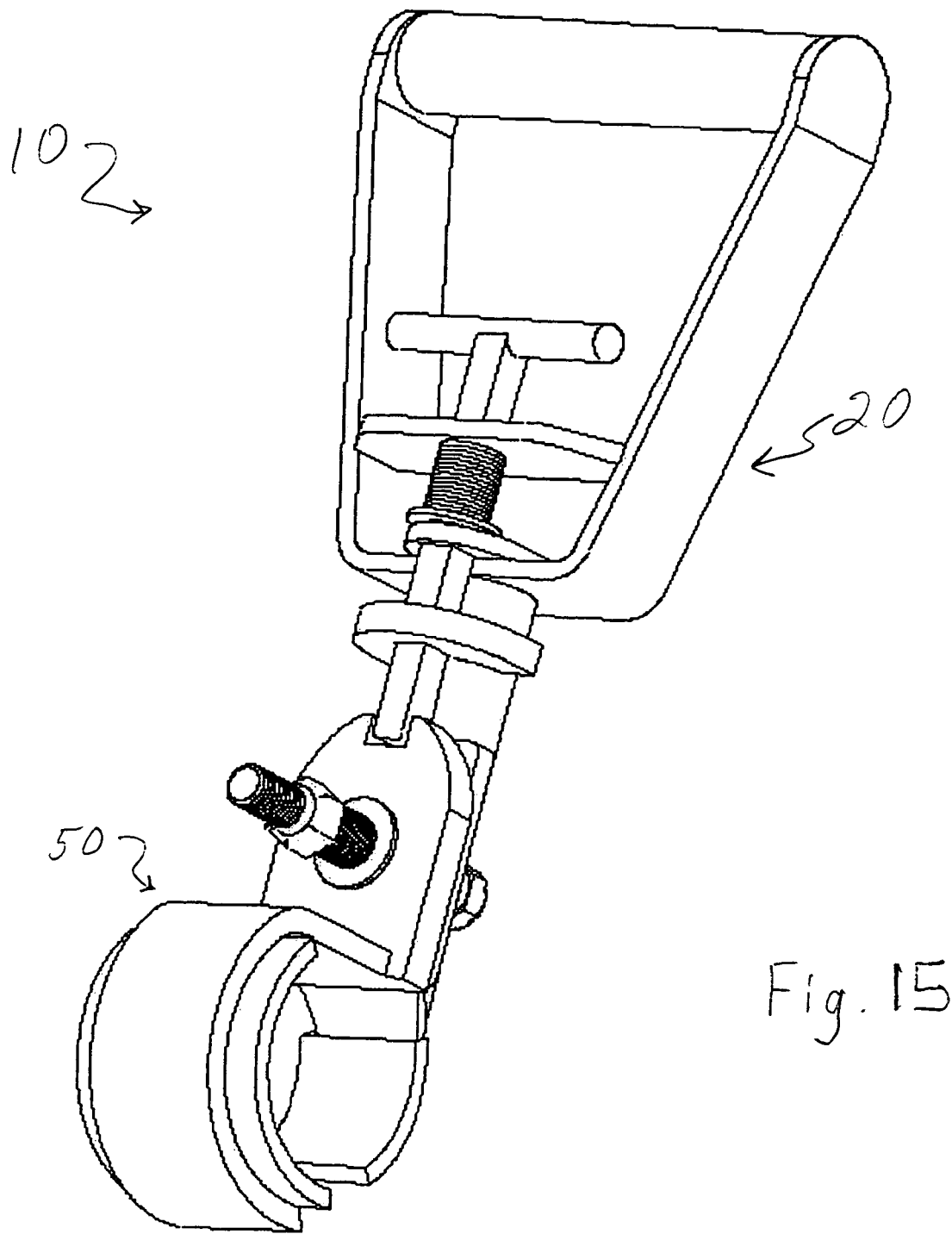
FIG. 15 is a perspective view of an exemplary embodiment of the present invention with the grapple in the non-rotated position.

For the exemplary embodiment of FIGS. 1-4, a rotatable grapple 50 is attached to the lift member body 22 with a bolt 52 and nut 54. As shown particularly in FIG. 1, and FIGS. 12-13, the grapple 50 has a planar portion 56 with a hole 57 for receiving the bolt and aligning with hole 60 in the lift member body, and a generally rectangular slot 58 for receiving the pin member first end 38. The pin member first end and slot interaction is shown in detail for this exemplary embodiment in FIG. 4. As further shown for this exemplary embodiment in FIG. 12, a first washer 62, second washer 64 and a spring 66 are positioned on the bolt to bias the grapple planar portion 56 against the lift member body 22, with the bias being adjustable to control the rotatability of the grapple with respect to the body. The grapple has a curved portion 70 with a first portion 72 attached to the grapple planar portion 56, and a similarly curved interior portion 74, which, in this exemplary embodiment, is generally circular with a diameter shaped to substantially correspond with the outside diameter of an elongated object 12. In other exemplary embodiments of my invention the diameter is at least as large, or larger, than the elongated object outside diameter.

Figure 3:
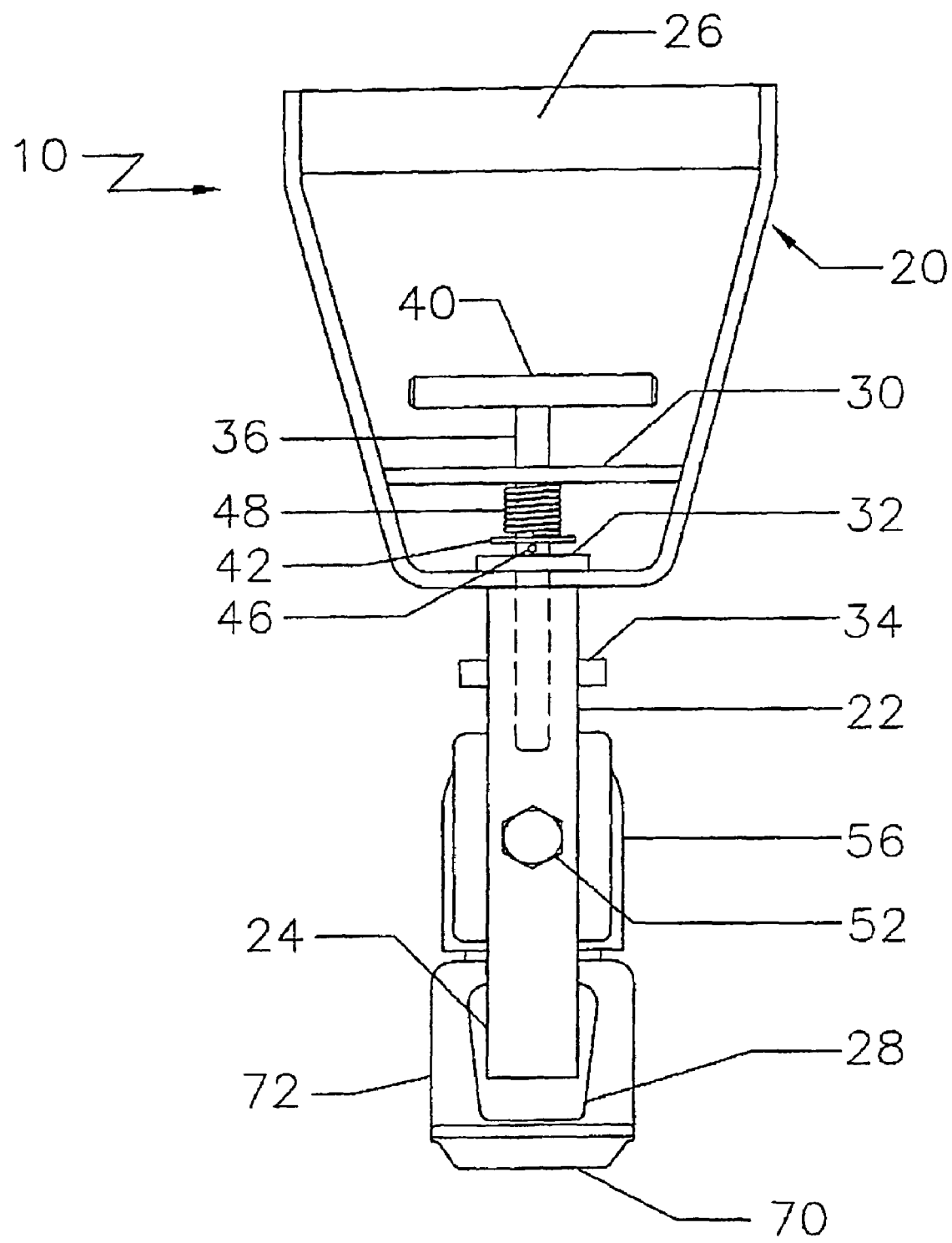
FIG. 3 is a rear view of an exemplary embodiment of the present invention with the rotatable grapple in the first position (closed).
Figure 4:
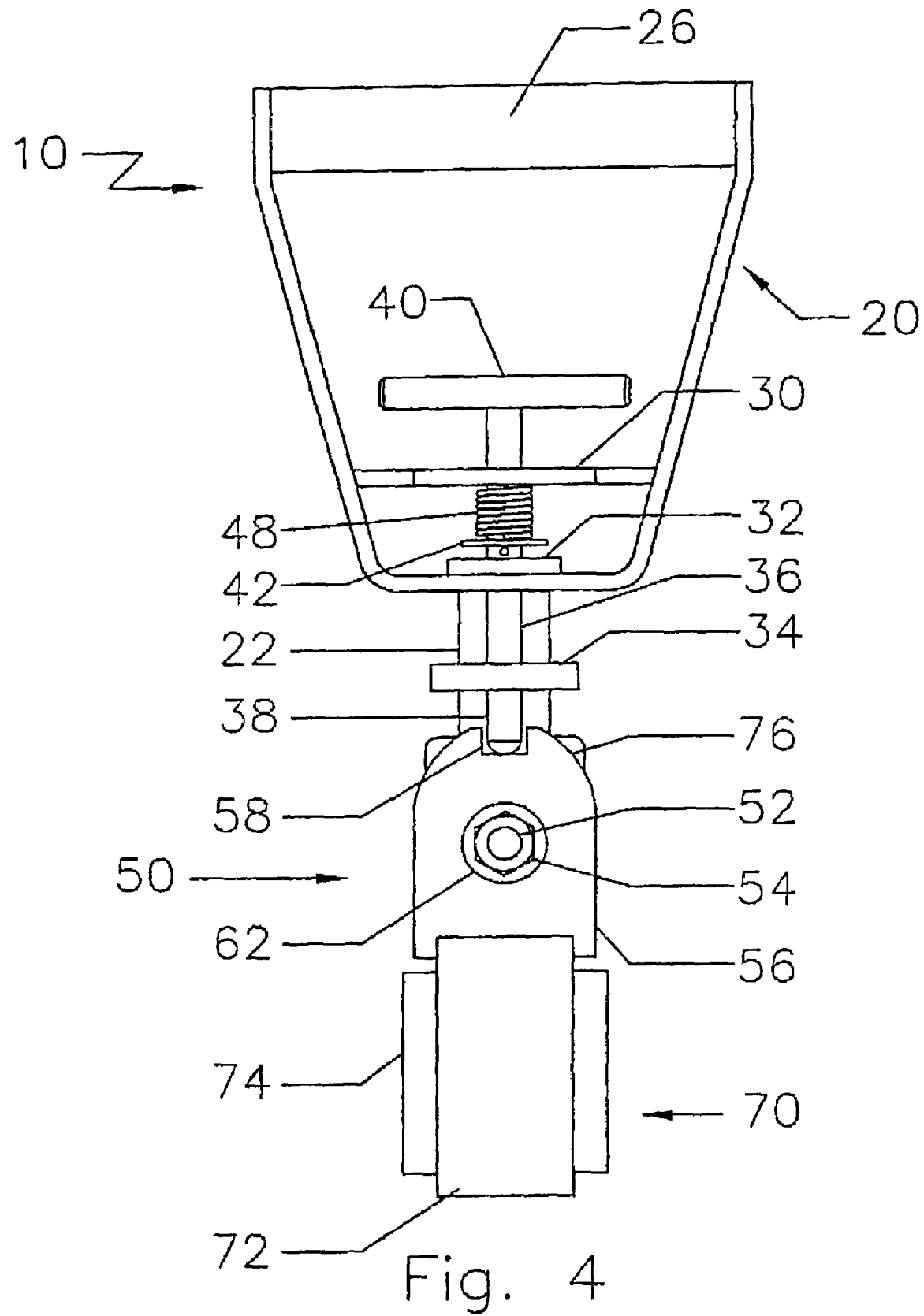
FIG. 4 is a front view of an exemplary embodiment of the present invention with the rotatable grapple in the first position (closed).
Figure 5:
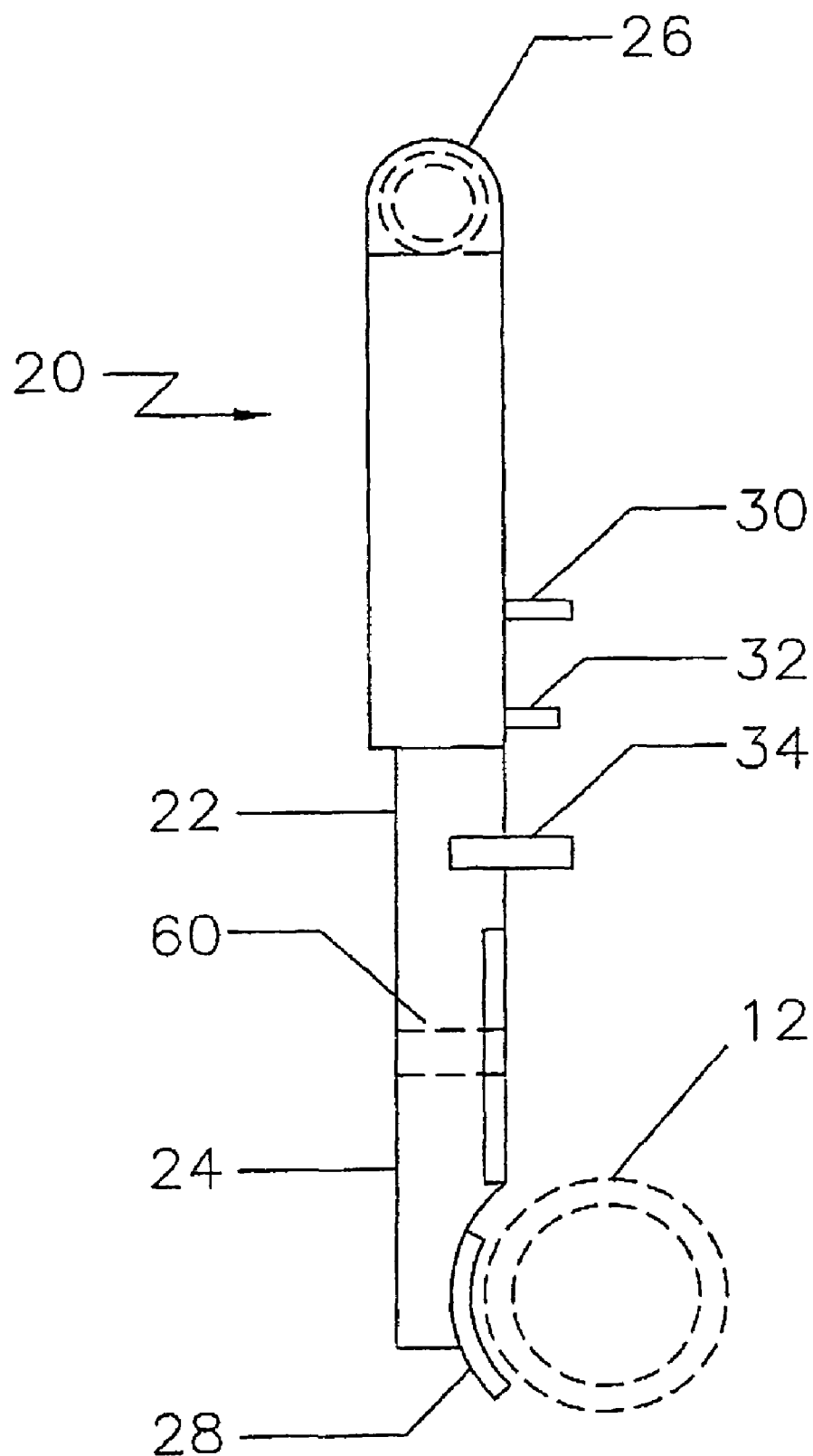
FIG. 5 is a side view of the lift member present in an exemplary embodiment of the present invention.
Figure 6:
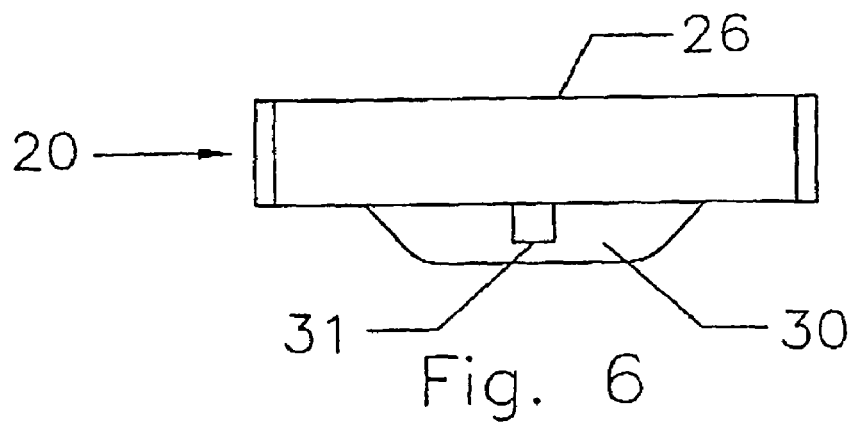
FIG. 6 is a top view of the lift member present in an exemplary embodiment of the present invention.
Figure 7:
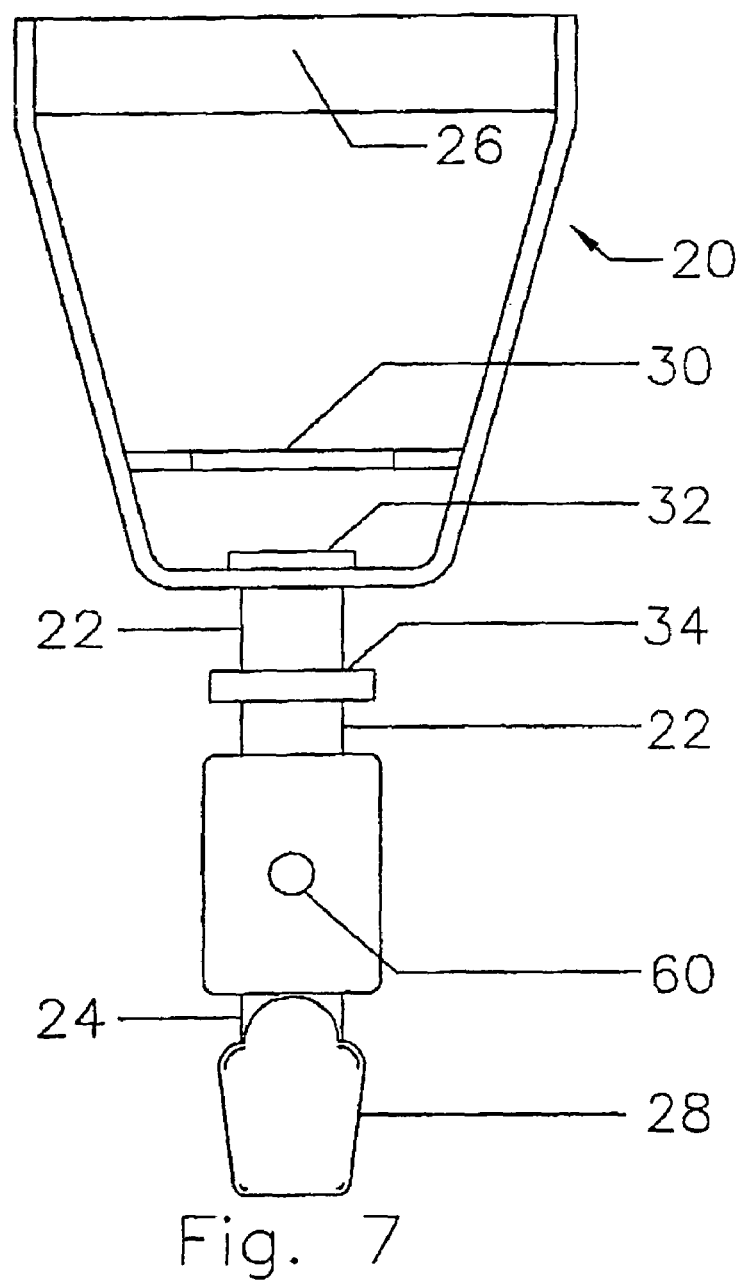
FIG. 7 is a front view of the lift member present in an exemplary embodiment of the present invention.
Figure 8:
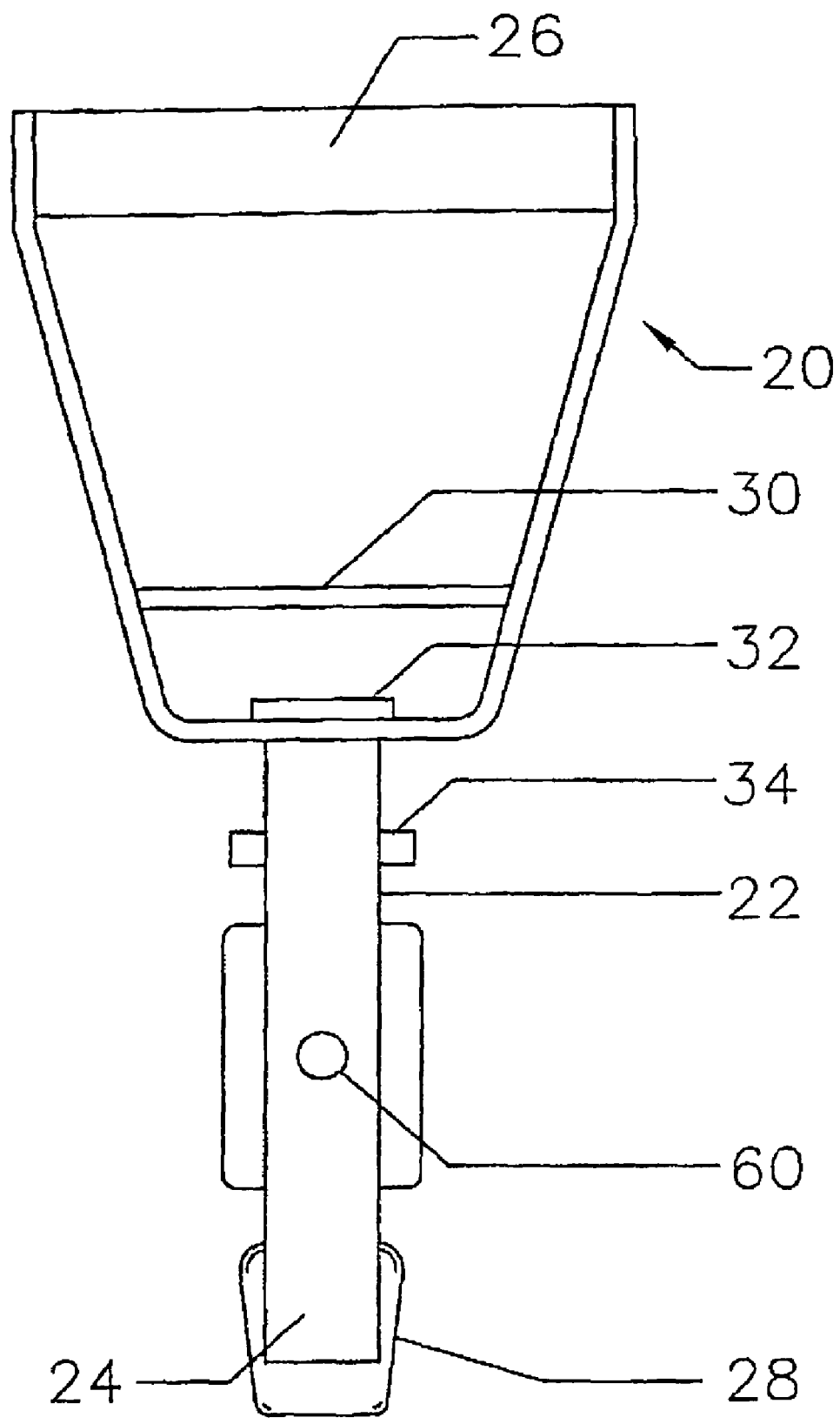
FIG. 8 is a rear view of the lift member present in an exemplary embodiment of the present invention.
Figure 9:
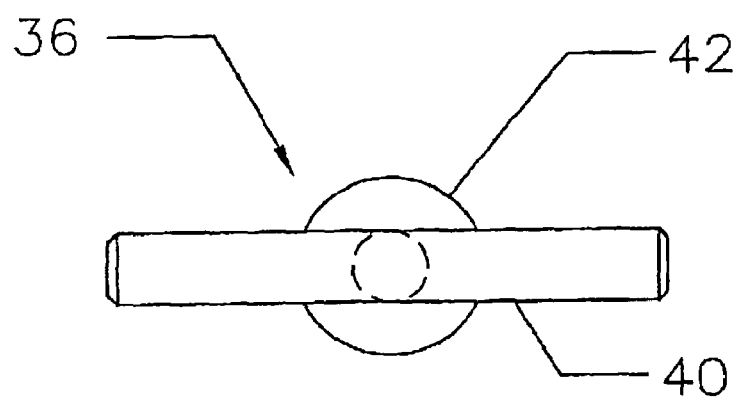
FIG. 9 is a top view of the pin member present in an exemplary embodiment of the present invention.
Figure 10:
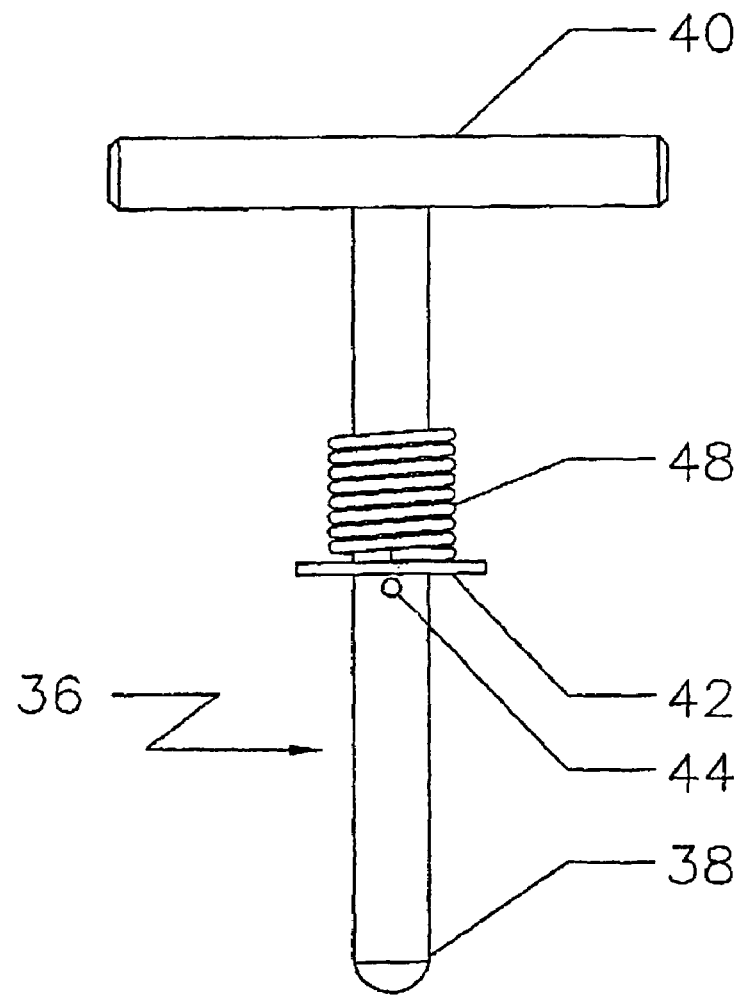
FIG. 10 is a front view of the pin member present in an exemplary embodiment of the present invention, also showing the spring assembly
Figure 11:
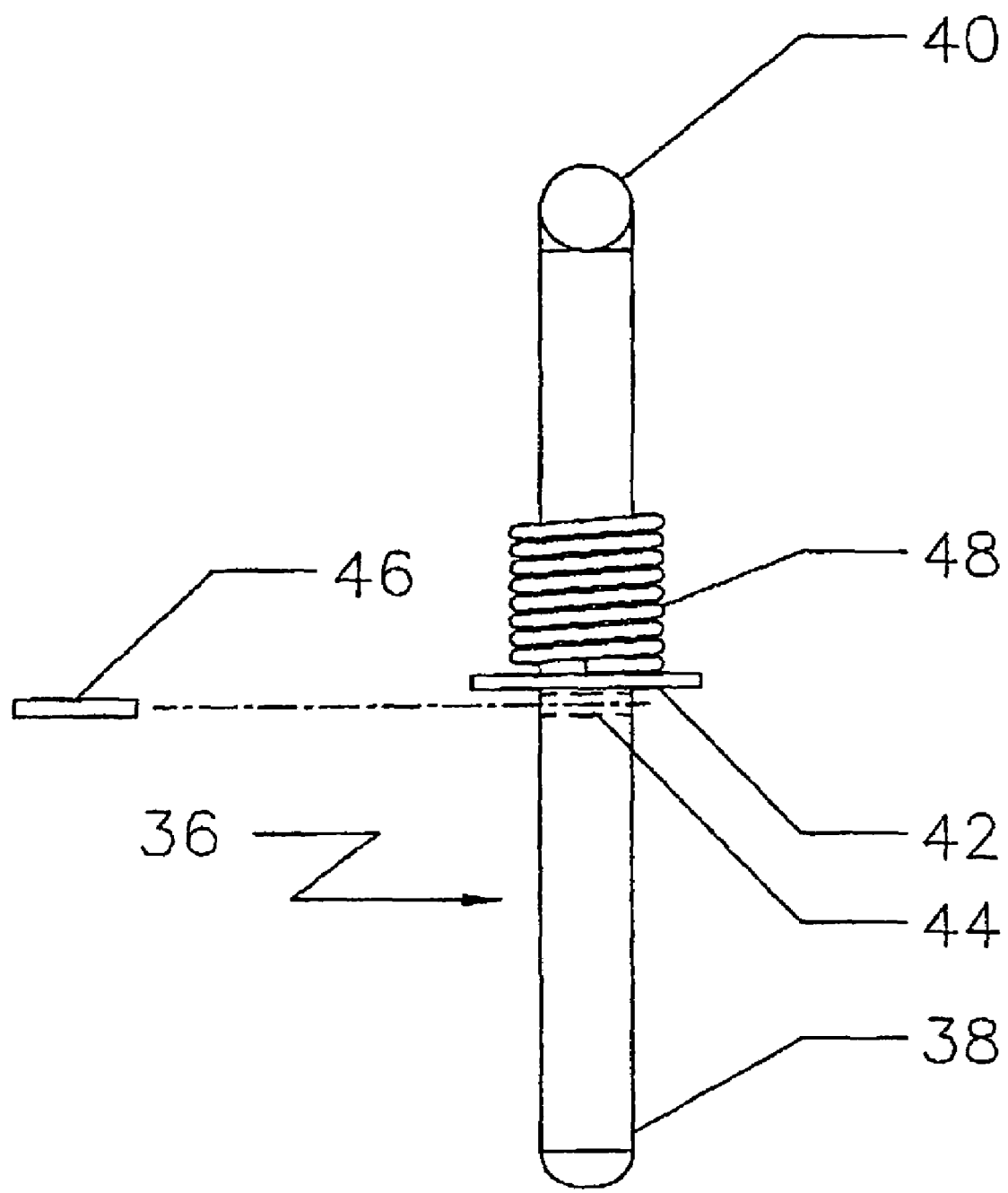
FIG. 11 is a side view of the pin member present in an exemplary embodiment of the present invention, also showing the spring assembly and the retaining pin, the retaining pin removed from the retaining pin hole for clarity.

In this exemplary embodiment, the grapple 50 is positionable in a first position as shown in FIG. 1 and FIGS. 3,4, in which the grapple is aligned with the lift member body 22, and the pin first end 38 is biased by the spring 48 into the grapple slot 58. The pin first end prevents rotation of the grapple until the user pulls the pin graspable second end 40 toward the pin second position. When this is done the grapple can be rotated in either direction. As further shown in FIG. 2, the grapple is rotatable to a second position.

In operation, the user simultaneously grasps the handle 26 and pin graspable second end 40, and by clenching the hand pulls the pin second end to its second position, thereby releasing the grapple 50 for rotation. Depending on how tight the nut 54 has been tightened, the user either allows gravity to rotate the grapple, or rotates the grapple to the grapple second position by using the other hand. For the grapple position shown in FIG. 2, the tool is can be grasped with the left hand and an elongated object 12 such as a pipe is to the user's left. The second position grapple is open for placing about the pipe, thus temporarily positioning the tool body 22 in a substantially aligned position with the pipe. By walking forward, substantially parallel to the pipe, the grapple remains about the pipe and the tool is moved to a substantially perpendicular position with respect to the pipe. By doing so, the grapple has been rotated to the first position. As the grapple moves with respect to the tool body, a curved portion 76 of the grapple planar portion 56 encounters the pin first end 38 and continuously displaces the pin toward the pin second position as needed to allow the grapple to rotate to the grapple first position. As the grapple reaches the grapple first position, the spring 66 biases the pin first end into the grapple planar portion slot 58, thus automatically locking the grapple into the first position, with the grapple curved interior portion 74 and the positioning member curved portion 28 being oppositely positioned and clasping the pipe, as shown in FIG. 1. In this position, with the pipe so clasped, the user is able to lift the pipe by pulling the handle 26 and raising the tool.

In the foregoing example, when the pipe has been carried to the desired location, the user lowers the tool until the pipe 12 is resting on the ground. The user then grasps the pin second end 40 and pulls until the pin first end 38 is removed from the grapple planar portion slot 58. The user can then move the tool body 22 until the grapple 50 is rotated to the grapple second position, where the grapple can be removed from the pipe.

In practice, the user will encounter elongated objects of various diameters and cross-sections. In other exemplary embodiments of my invention either or both of the grapple curved interior portion 74 and the positioning member curved portion 28 are resized to accommodate anticipated diameters and cross-sections. In some exemplary embodiments, the positioning member curved portion, forms a significantly smaller arc than the grapple curved interior portion 74, and is capable of properly securing varying diameters and cross-sections. In other exemplary embodiments, the grapple 50 is interchangeable with another grapple having a curved interior portion with a larger or smaller diameter, thus providing a closer fit for securing the elongated object.

In particular, the grapple curved interior portion 74 and the positioning member curved portion 28 are readily sizable to correspond with pipe diameters from 1 inch to 10 inches, including typical oil and gas industry pipe outer diameters, e.g. 2⅜, 2⅝, 3½, 4, 5½, and 6 inches.

With respect to the above description then, it is to be realized that the tool may be constructed from various metals and/or plastics depending upon the particular application, which will occur to those skilled in the art upon review of the present disclosure. For example, cast iron, aluminum, brass, or stainless steel, are suitable materials for the construction of the tool, in some cases, depending on the elongated object to be lifted.

All equivalent relationships to those illustrated in the drawings and described in the specification are intended to be encompassed by the present invention.

The descriptions in this specification are for purposes of illustration only and are not to be construed in a limiting sense.

The invention claimed is:

1. A tool for grasping and lifting an elongated object, the tool comprising:
   a graspable lift member having a body and a positioning member extending from the body;
   a slidable pin member positioned on the lift member, the pin member having a first end and a graspable second end, the pin member being movable from a first position to a second position closer to the lift member; and
   a rotatable grapple having an interior space capable of receiving the elongated object, the grapple being attached to the lift member for movement with respect to the lift member from a grapple first position to a grapple second position, the grapple having a pin member reception opening for receiving the pin member first end when the pin member and the grapple are each in the first position, such that the pin member retains the grapple in the first position;
   and further such that the grapple is free to rotate to the second position when the pin member is moved to the pin member second position, the grapple being open to accept the elongated object while in the grapple second position, the elongated object being secured within the grapple and the lift member positioning member when the grapple is moved to the first position.

2. The tool of claim 1, further comprising a biasing element, the biasing element biasing the pin member toward the pin member first position.

3. The tool of claim 2 wherein the biasing element comprises a spring.

4. The tool of claim 1, wherein the grapple forces the pin member toward the pin member second position as the grapple moves toward the grapple first position.

5. The tool of claim 1, further comprising a biasing element, the biasing element biasing the pin member toward the pin member first position, the biasing element bias causing the pin member first end to enter the grapple pin member reception opening when the grapple returns to the grapple first position, the biasing element biasing the pin member first end to remain in the grapple pin member reception opening.

6. The tool of claim 1, wherein the lift member and the pin member second end are simultaneously graspable by a single hand.

7. The tool of claim 6, wherein the pin member second end is movable toward the pin member second position while the lift member and the pin member are being simultaneously grasped by a single hand.

8. The tool of claim 1, wherein the elongated object is substantially tubular, the elongated object having an outer diameter, and further wherein the grapple has a curved interior, the curved interior having a diameter shaped to substantially correspond with the elongated object outer diameter.

9. The tool of claim 1, wherein the elongated object is substantially tubular, the elongated object having an outer diameter, and further wherein the lift member positioning member has a curved interior, the curved interior having a diameter to substantially correspond with the elongated object outer diameter.

10. The tool of claim 1, wherein the elongated object is substantially tubular, the elongated object having an outer diameter, and further wherein the grapple has a curved interior, the curved interior having a diameter at least as large as the elongated object outer diameter.

11. The tool of claim 1, wherein the elongated object is substantially tubular, the elongated object having an outer diameter, and further wherein the lift member positioning member has a curved interior, the curved interior having a diameter at least as large as the elongated object outer diameter.

12. The tool of claim 1, wherein pin member first end is substantially rectangular in cross-section and the grapple pin member reception opening is substantially rectangular for closely receiving the pin member first end.

13. The tool of claim 1, wherein the grapple is rotatable in two directions with respect to the lift member body.

14. The tool of claim 1, wherein the lift member has a handle by which the lift member is grasped, the pin member second end being positioned proximate the handle.

15. The tool of claim 1, wherein the lift member body has a front side, the pin member is positioned on the lift member front side, and the grapple rotates clockwise with respect to the lift body member when viewed toward the front of the lift body member.

16. The tool of claim 1, wherein the lift member body has a front side, the pin member is positioned on the lift member front side, and the grapple rotates counter-clockwise with respect to the lift body member when viewed toward the front of the lift body member.

17. The tool of claim 1, wherein the lift member body has a front side, the pin member is positioned on the lift member front side, and the grapple is rotatable in a clockwise and a counter-clockwise direction with respect to the lift body member when viewed toward the front of the lift body member.

18. The tool of claim 1, further comprising means for biasing the pin member toward the pin member first position.

19. A tool for grasping and lifting an elongated object, the tool comprising:
   a graspable lift member having a body and a positioning member extending from the body;
   a slidable pin member positioned on the lift member, the pin member having a first end and a second end, the pin member further comprising means for moving the pin member from a first position to a second position closer to the lift member; and
   a rotatable grapple having an interior space capable of receiving the elongated object, the grapple being attached to the lift member for movement with respect to the lift member from a grapple first position to a grapple second position, the grapple further comprising means for receiving the pin member first end when the pin member and the grapple are each in the first position, such that the pin member retains the grapple in the first position;
   and further such that the grapple is free to rotate to the second position when the pin member is moved to the pin member second position, the grapple being open to accept the elongated object while in the grapple second position, the elongated object being secured within the grapple and the lift member positioning member when the grapple is moved to the first position.

20. The tool of claim 19, wherein the grapple further comprises means for forcing the pin member toward the pin member second position as the grapple moves toward the grapple first position.

21. The tool of claim 19, further comprising means for biasing the pin member toward the pin member first position, such means causing the pin member first end to be received by the means for receiving the pin member first end when the grapple returns to the grapple first position, such means biasing the pin member first end to remain in a received position with respect to the means for receiving the pin member first end.

22. The tool of claim 19, wherein the lift member further comprises means for holding the lift member, the pin member second end being positioned proximate the means for holding the lift member.

* * * * *